(12) United States Patent
Kashiwagi et al.

(10) Patent No.: US 10,086,441 B2
(45) Date of Patent: Oct. 2, 2018

(54) GRIPPING MECHANISM

(71) Applicant: Shin-Etsu Chemical Co., Ltd., Tokyo (JP)

(72) Inventors: Yusuke Kashiwagi, Ibaraki (JP); Tetsuya Otosaka, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 15/273,726

(22) Filed: Sep. 23, 2016

(65) Prior Publication Data

US 2017/0087642 A1 Mar. 30, 2017

(30) Foreign Application Priority Data

Sep. 25, 2015 (JP) .................... 2015-187824

(51) Int. Cl.
*B23B 31/02* (2006.01)
*B23B 31/163* (2006.01)
(Continued)

(52) U.S. Cl.
CPC .. *B23B 31/16004* (2013.01); *B23B 31/16008* (2013.01); *C03B 37/01486* (2013.01);
(Continued)

(58) Field of Classification Search
CPC .......... B23B 31/16008; B23B 2226/16; B23B 2231/22; B23B 31/816004;
(Continued)

(56) References Cited

U.S. PATENT DOCUMENTS

| 3,190,666 A | 6/1965 | Testa |
| 6,339,868 B1 | 1/2002 | Nagaya et al. |
| 2011/0277602 A1 | 11/2011 | Kobayasi |

FOREIGN PATENT DOCUMENTS

| CN | 1934041 | 3/2007 |
| DE | 202006000640 U1 | 3/2006 |
| JP | 2008-178956 A | 8/2008 |

OTHER PUBLICATIONS

Extended European Search Report for European Patent Application No. 16190228.3, issued by the European Patent Office dated Feb. 2, 2017.
(Continued)

*Primary Examiner* — Daniel Howell
*Assistant Examiner* — Paul M Janeski

(57) ABSTRACT

To prevent a lowering of gripping force due to temperature changes, provided is a gripping mechanism including a plurality of chuck claws that, when having come close to each other, generate a gripping force on a gripped body; a chuck body that holds the plurality of chuck claws on a common planar surface, and moves them on the planar surface; and a plurality of chuck plates that, when each of the plurality of chuck claws grips the gripped body, are interposed between each of the plurality of chuck claws and the gripped body. A thermal expansion coefficient $\alpha_1$ of the plurality of chuck claws, a thermal expansion coefficient $\alpha_2$ of the plurality of chuck plates and a thermal expansion coefficient $\alpha_W$ of the gripped body have a relationship indicated by $$\alpha_W < \alpha_1 < \alpha_2 \qquad \text{(Equation 1).}$$

5 Claims, 3 Drawing Sheets

(51) Int. Cl.
  *C03B 37/014* (2006.01)
  *C03B 37/018* (2006.01)
  *C03B 37/027* (2006.01)

(52) U.S. Cl.
  CPC .. *C03B 37/01884* (2013.01); *C03B 37/02736* (2013.01); *B23B 2226/18* (2013.01); *B23B 2231/22* (2013.01)

(58) Field of Classification Search
  CPC ........ C03B 37/01486; C03B 37/01884; C03B 37/02736
  See application file for complete search history.

(56) References Cited

OTHER PUBLICATIONS

Office Action issued for counterpart Chinese Application 201610842828.0, issued by the Chinese Intellectual Property Office dated Mar. 21, 2018.

GRIPPING MECHANISM

The contents of the following Japanese patent application are incorporated herein by reference NO. 2015-187824 filed on Sep. 25, 2015.

BACKGROUND

1. Technical Field

The present invention relates to a gripping mechanism.

2. Related Art

The gripping force exerted on a gripped body by a gripping mechanism including a chuck lowers in some cases due to temperature changes. To cope with this, a collet chuck-type gripping structure designed to suppress lowering of the gripping force due to the restoring force of a spring has been proposed (see Patent Document 1, for example).

Patent Document 1: Japanese Patent Application Publication No. 2008-178956

Japanese Industrial Standard defines [B 6151-1993] as a scroll gear-type gripping mechanism having another structure. The gripping force of a scroll gear-type chuck also lowers in some cases due to temperature changes. However, the structure described in the above-mentioned document cannot be applied to a scroll gear-type chuck.

SUMMARY

An aspect of the present invention provides a gripping mechanism including:

a plurality of chuck claws that, when having come close to each other, generate a gripping force on a gripped body;

a chuck body that holds the plurality of chuck claws on a common planar surface, and moves them on the planar surface; and a plurality of chuck plates that, when each of the plurality of chuck claws grips the gripped body, are interposed between each of the plurality of chuck claws and the gripped body, wherein a thermal expansion coefficient $\alpha_1$ of the plurality of chuck claws, a thermal expansion coefficient $\alpha_2$ of the plurality of chuck plates and a thermal expansion coefficient $\alpha_W$ of the gripped body has a relationship indicated by Equation 1:

$$\alpha_W < \alpha_1 < \alpha_2 \quad \text{(Equation 1)}$$

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
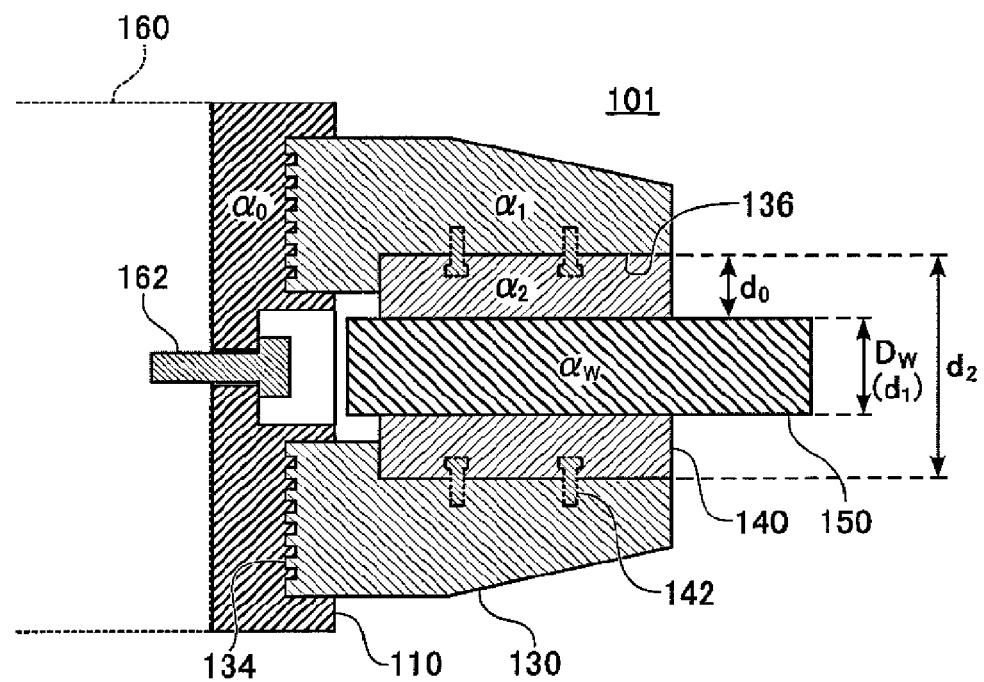
FIG. 1 is an outline sectional view of a gripping mechanism 101.

FIG. 1 is a schematic outline sectional view of a gripping mechanism 101. The gripping mechanism 101 is a scroll chuck having one-piece type jaws 130, and has a chuck body 110, the jaws 130 and a chuck plate 140. Also, the illustrated gripping mechanism 101 is gripping a gripped body 150. The gripped body 150 is for example a glass cylindrical bar that forms an end portion of an optical fiber base material.

The chuck body 110 has a disk-like outer shape. Also, the chuck body 110 is coupled, by a fixation bolt 162 inserted at its center in the thickness direction, to a rotation axis 160 of a rotary driving mechanism.

Also, the chuck body 110 has a scroll gear (not illustrated) built-in as a driving mechanism. The scroll gear has a spiral groove that is open toward one surface of the chuck body 110. This groove meshes with tooth flanks 134 formed on end portions of the jaws 130 that are described below. Accordingly, if a driving force is supplied from the outside of the chuck body 110 to rotate the scroll gear, a driving force moving in a radial direction of the chuck body 110 is transmitted to the jaws 130.

Furthermore, the chuck body 110 holds a plurality of the jaws 130 on the above-mentioned one surface. Each of the plurality of jaws 130 is disposed at a constant interval in the circumferential direction on a circular surface of the chuck body 110. If two or more jaws 130 are provided, the gripping mechanism 101 can grip the gripped body 150, but in cases for example where an end portion of a cylindrical bar is to be gripped, three or more jaws 130 are provided.

Each of the plurality of jaws 130 has a shape protruding from the chuck body 110, and has a high strength and rigidity. Also, each of the jaws 130 is held relative to the chuck body 110 such that the jaw 130 can move in a radial direction of the chuck body 110. Furthermore, each of the plurality of jaws 130 has, at an end portion thereof on the chuck body 110 side, the tooth flanks 134 that mesh with the scroll gear.

If the scroll gear is rotated in the chuck body 110, the plurality of jaws 130 moves along the front surface of the chuck body 110 while maintaining a positional relationship where they are arranged concentrically with the circle formed by one surface of the chuck body 110. In other words, if the scroll gear does not rotate in the chuck body 110, the jaws 130 meshing with the scroll gear are fixed relative to the chuck body 110.

Accordingly, if the plurality of jaws 130 have moved and have come close to each other, the gripped body 150 is gripped between the jaws 130 whose intervals have become narrow. Also, if the plurality of jaws 130 have moved and have become distanced from each other, the gripped body 150 that had been gripped by the plurality of jaws 130 is released.

In the gripping mechanism 101, the chuck plate 140 is attached to a surface, of each of the plurality of jaws 130, facing the gripped body 150. Each of the chuck plates 140 is fixed, by a screw 142, relative to the jaw 130. Thereby, if the gripped body 150 is gripped in the gripping mechanism 101, the chuck plate 140 is sandwiched between each of the plurality of jaws 130 and the gripped body 150. Accordingly, by replacing chuck plates 140, the surfaces of the jaws 130 to contact the gripped body 150 can be renewed.

Japanese Industrial Standard [B 6151-1993] about a scroll chuck as the gripping mechanism 101 defines that jaws 130 should have a hardness of 55 HRC or higher. Accordingly, the jaws 130 of the gripping mechanism 101 are formed with a material that has a strength defined by the standard, for example, steel for general structures, carbon steel for mechanical structures, alloy steel for mechanical structures or the like as its material. The thermal expansion coefficients of steel materials such as steel for general structures, carbon steel for mechanical structures, or alloy steel for mechanical structures are 10 to 13×10⁻⁶/K.

In the gripping mechanism 101, members other than the jaws 130 such as the chuck body 110 including the scroll gear are also often formed with steel castings, forgings or the like. These materials also have thermal expansion coefficients that are similar to those of steel for general structures, carbon steel for mechanical structures, alloy steel for mechanical structures or the like. Accordingly, an assembly including the chuck body 110 and the jaws 130 has a generally uniform thermal expansion coefficient as a whole.

If a temperature change occurs in a state where the gripped body 150 formed with a material having a low thermal expansion coefficient such as synthetic quarts or an invar material is gripped by a scroll chuck formed with a material like those mentioned above, the gripping force exerted on the gripped body 150 by the gripping mechanism 101 lowers in some cases due to the difference in the thermal expansion coefficients of the gripping mechanism 101 and the gripped body 150. If the gripping force is insufficient in the gripping mechanism 101, there is a risk of the gripped body 150 falling, and also there is a concern about damages to the gripped body 150 itself and facilities including the gripping mechanism.

For example, in a step of manufacturing a glass base material for optical fiber, a glass particle-containing flame is impinged upon in a state where a dummy rod formed with synthetic quarts or the like is gripped by the gripping mechanism 101. For this reason, the temperature of the gripping mechanism 101 also rises due to heat transmitted through the gripped body 150, but because the thermal expansion coefficient of the gripping mechanism 101 is significantly different from the thermal expansion coefficient of a glass base material, there is a possibility of the force to sandwich the gripped body 150 lowering due to widening intervals of the jaws 130 in the gripping mechanism 101.

Here, a case where a temperature change has occurred in a state where the gripping mechanism 101 is gripping the gripped body 150 having a diameter $D_W$ is considered. It is assumed that a pair of the chuck plates 140 having a respective thicknesses of $D_0$ sandwiches the gripped body 150, and each of the chuck plates 140 is attached to the jaws 130 that are disposed at positions that are symmetric about the center of the chuck body 110 facing each other. The thermal expansion coefficient of the jaws 130 is $\alpha_1$, the thermal expansion coefficient of the chuck plates 140 is $\alpha_2$, and the thermal expansion coefficient of the gripped body 150 is $\alpha_w$. The thermal expansion coefficient $\alpha_0$ of the chuck body 110 is assumed to be equal to the thermal expansion coefficient $\alpha_1$ of the jaws 130.

An initial interval $d_1$ between the pair of chuck plates 140 gripping the gripped body 150 is equal to the diameter $D_W$ of the gripped body 150. Accordingly, about the mutually facing jaws 130, an interval $d_2$ of surfaces 136 that support the rear surfaces of the chuck plates 140 can be expressed by Equation 2:

$$d_2 = (2d_0 + D_W) \qquad \text{(Equation 2)}$$

Next, if the temperature of the gripping mechanism 101 gripping the gripped body 150 changes, and for example, the temperature rises, the entire assembly formed by the chuck body 110 and the jaws 130 expands with heat, and the interval $d_2$ of the surfaces 136 supporting the rear surfaces of the chuck plate 140 changes. A change amount $\Delta d_2$ per unit temperature change amount of the interval $d_2$ is expressed by Equation 3:

$$\Delta d_2 = \alpha_1(2d_0 + D_W) \qquad \text{(Equation 3)}$$

Also, about each chuck plate 140, a change amount $\Delta d_0$ of the thickness $d_0$ per unit temperature change amount can be expressed by Equation 4:

$$\Delta d_0 = \alpha_2 d_0 \qquad \text{(Equation 4)}$$

Furthermore, because each of the chuck plates 140 is attached to a jaw 130, about the interval $d_1$ of the chuck plates 140 sandwiching the gripped body 150 in the gripping mechanism 101, a change amount $\Delta d_1$ per unit temperature change amount can be expressed by Equation 5:

$$\Delta d_1 = 2d_0(\alpha_1 - \alpha_2) + \alpha_1 d_1 \qquad \text{(Equation 5)}$$

On the other hand, about the outer diameter $D_W$ of the gripped body 150 having the thermal expansion coefficient $\alpha_W$, an outer diameter change amount $\Delta D_W$ per unit temperature change can be expressed by Equation 6:

$$\Delta D_W = \alpha_w D_w \qquad \text{(Equation 6)}$$

Here, as indicated by Equation 7, if the outer diameter change amount $D_W$ of the gripped body 150 indicated by Equation 6 is larger than the change amount $\Delta d_1$ of the interval $d_1$ of the chuck plates 140, the force of the chuck plates 140 in the gripping mechanism 101 to fasten the gripped body 150 does not lower even when a temperature change occurs.

$$2d_0(\alpha_1 - \alpha_2) + \alpha_1 D_w \leq \alpha_w D_w \qquad \text{(Equation 7)}$$

Equation 7 can be modified into Equation 8 paying attention to the thickness $d_0$ of the chuck plates 140.

$$d_0 \leq \{D_W(\alpha_W - \alpha_1)\}/\{2(\alpha_1 - \alpha_2)\} \qquad \text{(Equation 8)}$$

Accordingly, the gripping mechanism 101 whose gripping force does not lower due to temperature changes can be formed by selecting a material and the thickness $d_0$ of the chuck plates 140 in the gripping mechanism 101 so as to satisfy Equation 8:

However, the interval $d_2$ of the surfaces 136 of the jaws 130 is equal to or larger than the sum $(2d_0)$ of the thicknesses of the two chuck plates 140. Accordingly, in the gripping mechanism 101, in order for Equation 8 to hold, it is premised that the thermal expansion coefficient $\alpha_1$ of the jaws 130, the thermal expansion coefficient $\alpha_2$ of the chuck plates 140 and the thermal expansion coefficient $\alpha_W$ of the gripped body 150 have the relationship indicated by Equation 1:

$$\alpha_W < \alpha_1 < \alpha_2 \qquad \text{(Equation 1)}$$

When the condition of Equation 8 are to be met, the larger the absolute value of the difference between the thermal expansion coefficient $\alpha_1$ of the jaws 130 and the thermal expansion coefficient $\alpha_2$ of the chuck plates 140, the larger the thickness $d_0$ of the chuck plates 140. Also, the range of the outer diameter $D_W$ of the gripped body 150 at which the gripped body 150 can be gripped without lowering of the fastening force widens.

More specifically, taking into consideration a thermal expansion coefficient of a metallic material that can be used industrially as a material of the jaws 130, if the thermal expansion coefficient $\alpha_1$ of the jaws 130 is within the range of 0.5 to 19.0×10⁻⁶/K, the thermal expansion coefficient $\alpha_2$ of the chuck plates 140 is preferably within the range of 16.0 to 24.0×10⁻⁶/K.

Furthermore, it is assumed in the above-mentioned explanation that the thermal expansion coefficient $\alpha_0$ of the chuck body 110 including a driving mechanism such as a scroll gear is equal to the thermal expansion coefficient $\alpha_1$ of the jaws 130. However, the thermal expansion coefficients $\alpha_0$ and $\alpha_1$ may not be the same.

However, if the thermal expansion coefficient $\alpha_0$ of the chuck body 110 is lower than the thermal expansion coefficient of the jaws 130, a change in the interval $d_1$ due to a temperature change is suppressed. Accordingly, a chuck plate 140 whose thickness $d_0$ is smaller or whose thermal expansion coefficient $\alpha_1$ is lower can be used. Accordingly, the thermal expansion coefficient $\alpha_0$ of the chuck body 110 and the thermal expansion coefficient $\alpha_1$ of the jaws 130 preferably are in a relationship that meets Equation 9:

$$\alpha_0 \leq \alpha_1 \qquad \text{(Equation 9)}$$

Figure 2:
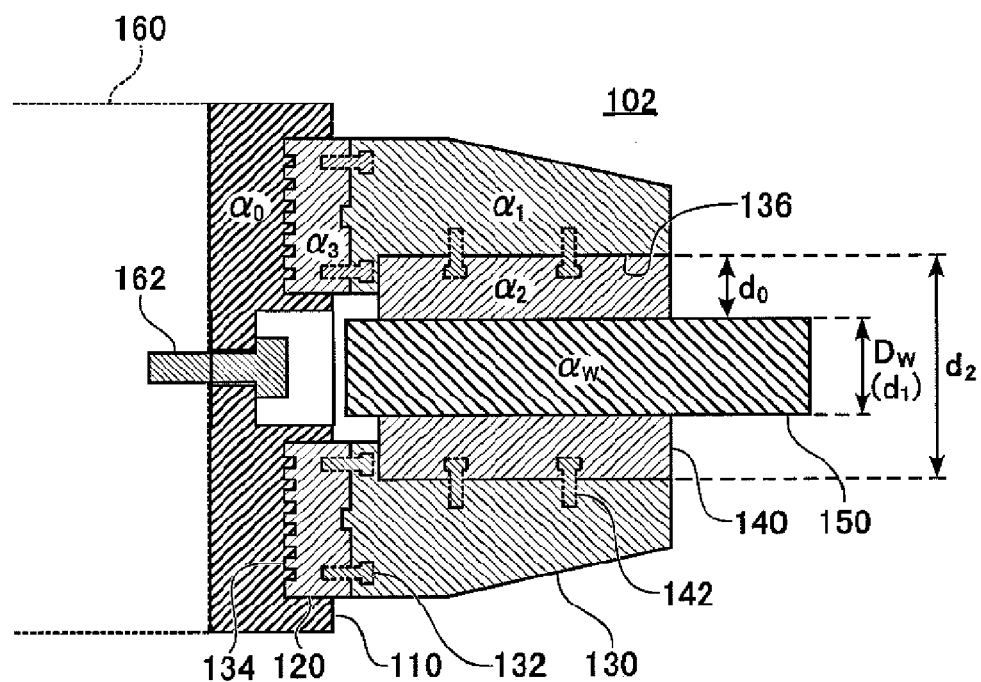
FIG. 2 is an outline sectional view of a gripping mechanism 102.

FIG. 2 is an outline sectional view illustrating the structure of a gripping mechanism 102 comprising two-piece type jaws 130 that are different from one-piece type jaws of the gripping mechanism 101 illustrated in FIG. 1. The gripping mechanism 102 has the same structure as the gripping mechanism 101 illustrated in FIG. 1 except for the points explained below. Common elements are provided with the same reference numbers, and redundant explanation is omitted.

The gripping mechanism 102 has a structure different from that of the gripping mechanism 101 in that each of the plurality of jaws 130 is respectively attached to the chuck body 110 via a base portion 120. The base portion 120 has the tooth flanks 134 that mesh with a scroll gear built into the chuck body 110, and is disposed on one circular surface of the chuck body 110.

The chuck body 110 in the gripping mechanism 102 holds a plurality of the base portions 120 on one surface. Each of the plurality of base portions 120 is disposed at a constant interval in the circumferential direction on the circular surface of the chuck body 110. Also, the jaws 130 are held relative to the chuck body 110 such that they can move in a radial direction of the chuck body 110.

Each of the plurality of jaws 130 has a shape protruding from one surface of the chuck body 110, and is respectively fixed to any of the plurality of base portions 120 by a screw 132. Thereby, if the scroll gear is rotated in the chuck body 110, the plurality of jaws 130 moves in a radial direction of the chuck body 110 together with the base portions 120 while maintaining a positional relationship where they are arranged concentrically with the circle formed by one surface of the chuck body 110. Also, if the scroll gear does not rotate in the chuck body 110, the jaws 130 are fixed relative to the chuck body 110 via the base portions 120 meshing with the scroll gear.

Accordingly, similar to the gripping mechanism 101, if the plurality of jaws 130 have moved and have come close to each other, the gripped body 150 is gripped between the jaws 130 whose intervals have become narrow. Also, if the plurality of jaws 130 have moved and have become distanced from each other, the gripped body 150 that had been gripped by the plurality of jaws 130 is released. Similar to the gripping mechanism 101, each of the plurality of jaws 130 sandwiches the gripped body 150 via the chuck plate 140 fixed by the screws 142.

The base portions 120 in the gripping mechanism 102 having the above-mentioned structure have, for example, the same thermal expansion coefficient $\alpha_0$ as the chuck body 110. Accordingly, the thermal expansion coefficient of the entire assembly including the chuck body 110, the base portions 120 and the jaws 130 becomes generally uniform. As a result, the gripping mechanism 102 also satisfies the same conditions as the gripping mechanism 101 does, and lowering of the gripping force due to temperature changes can be prevented.

Most materials exhibit changes in their thermal expansion coefficients depending on temperature. Accordingly, a series of the above-mentioned conditions about thermal expansion coefficient is desirably satisfied within a temperature range at which the gripping mechanisms 101 and 102 are used. As a result, for example, if the gripping mechanisms 101 and 102 are to be used in a sintering device that sinters optical fiber base materials, the above-mentioned conditions about thermal expansion coefficient are preferably satisfied within a temperature range of room temperature (for example, 0 to 30° C.) or higher and 250° C. or lower.

EXPERIMENTAL EXAMPLE

As materials to form the chuck body 110, the base portions 120 and jaws 130 in the gripping mechanisms 101 and 102, the materials shown in Table 1 were prepared. Also, as a material to form the chuck plates in the gripping mechanisms 101 and 102, the materials shown in Table 2 were prepared. The thermal expansion coefficients within the temperature range of 250° C. or lower are shown together.

TABLE 1

| Jaw Materials | Thermal Expansion Coefficients ($\alpha_1$) [$\times 10^{-6}$/K] |
|---|---|
| Steel for general structures | 10-12 |
| Carbon steel for mechanical structures | 10-12 |
| Alloy steel for mechanical structures | 10-12 |
| Martensite stainless | 9-11 |
| Ferrite stainless | 9-11 |
| Invar alloy | 0.5-3 |

TABLE 2

| Chuck Plate Materials | Thermal Expansion Coefficients ($\alpha_2$) [$\times 10^{-6}$/K] |
|---|---|
| aluminum alloy | 22-24 |
| austenite stainless | 16-18 |

First, as a material to form the chuck body 110, the base portions 120 and the jaws 130, carbon steel for mechanical structures, S45C ($\alpha_1$: $12.1 \times 10^{-6}$/K), was selected from among the materials shown in Table 1. Also, as a material of the chuck plates 140, aluminum alloy, A5052 ($\alpha_2$: $23.8 \times 10^{-6}$/K), was selected from among the materials shown in Table 2. Furthermore, in order to evaluate changes in the gripping force, synthetic quarts ($\alpha_w$: $0.6 \times 10^{-6}$/K) having an outer diameter $D_w$ of 80 mm was prepared.

By using the thermal expansion coefficients of the selected materials, the thickness $d_0$ of the chuck plates 140 that satisfies Equation 8 if the gripped body 150 is gripped was calculated, and the relationship between the thickness $d_0$ of the chuck plates 140 and the outer diameter of the gripped body 150 was plotted in a graph. The graph is shown in FIG. 3.

Figure 3:
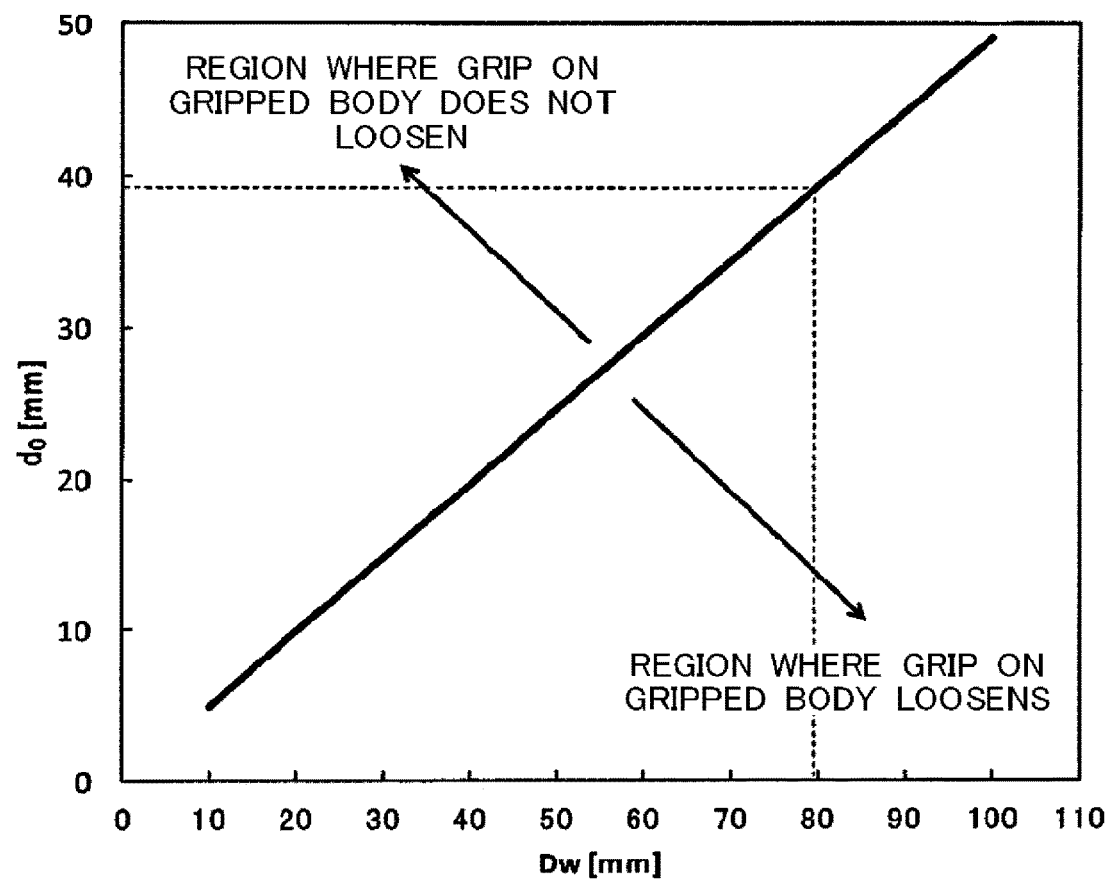
FIG. 3 is a graph showing a relationship between an outer diameter $D_w$ of a gripped body 150 and a thickness $d_0$ of a chuck plate 140.

As can be known from FIG. 3, if the outer diameter of the gripped body 150 is 80 mm, the thickness $d_0$ of the chuck plates 140 that does not cause lowering of the gripping force for the gripped body 150 due to temperature changes can be known to be 39.3 mm or larger. Accordingly, a chuck plate 140 having a thickness of 40 mm was manufactured, and mounted on the gripping mechanisms 101 and 102, and changes in the gripping force due to temperature changes were evaluated.

First, in a state where both the entire gripping mechanism 101 manufactured with the above-mentioned materials and dimensions, and the cylindrical gripped body 150 formed with synthetic quarts and having an outer diameter of 80 mm are at room temperature (298 K), the gripping mechanism 101 was caused to grip the gripped body 150. The gripping force exerted on the gripped body by the gripping mechanism 101 was set to a force that does not allow rotation of the gripped body 150 even if it was attempted to rotate the gripped body 150 in its circumferential direction by a manual force.

Next, the gripping mechanism 101 and the gripped body 150 are entirely heated to 489 K. Although in this state, it was attempted to rotate the gripped body 150 by a method which is the same as that for the case of room temperature, the gripped body 150 was gripped firmly by the gripping mechanism 101, and the gripped body 150 could not be rotated. In evaluating the force to grip the gripped body 150, the gripped body 150 was held by hands wearing, on them, leather-made gloves which were the same for both the case of room temperature and the case of high temperature, and it was attempted to rotate the gripped body 150.

As can be seen, the gripping force exerted by the gripping mechanisms 101 and 102 on the gripped body 150 does not lower even if temperature changes. Accordingly, the gripped body 150 can be gripped stably even in an environment or use that accompanies rapid temperature changes.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

101, 102: gripping mechanism; 110: chuck body; 120: base portion; 130: jaw; 132, 142: screw; 134: tooth flank; 136: surface; 140: chuck plate; 150: gripped body; 160: rotation axis; 162: fixation bolt

What is claimed is:

1. A gripping mechanism comprising:
a plurality of chuck claws that, by coming close to each other, generate a gripping force on a gripped body disposed at a center of the plurality of chuck claws;
a chuck body that holds the plurality of chuck claws on a common planar surface, and moves them on the planar surface; and
a plurality of chuck plates that are interposed between each of the plurality of chuck claws and the center of the plurality of chuck claws, wherein
a thermal expansion coefficient $\alpha_1$ of the plurality of chuck claws, and a thermal expansion coefficient $\alpha_2$ and a thickness $d_0$ of the plurality of chuck plates have relationships with a thermal expansion coefficient $\alpha_W$ and an outer diameter $D_w$ of the gripped body according to:

$$d_0 \leq \{D_W(\alpha_W - \alpha_1)\}/\{2(\alpha_1 - \alpha_2)\}, \text{ and}$$

$$\alpha_W < \alpha_1 < \alpha_2.$$

2. The gripping mechanism according to claim 1, wherein the relationship of Equation 1 is satisfied within a temperature range of 0° C. or higher and 250° C. or lower.

3. The gripping mechanism according to claim 1, wherein the chuck body transmits a driving force to tooth flanks of each chuck claw to move them on the planar surface.

4. The gripping mechanism according to claim 1, wherein if the chuck body has a thermal expansion coefficient $\alpha_0$, a relationship indicated by Equation 2 holds:

$$\alpha_0 \leq \alpha_1 \qquad \text{(Equation 2)}$$

5. The gripping mechanism according to claim 1, wherein the thermal expansion coefficient $\alpha_1$ is $0.5 \times 10^{-6}$/K or higher and $19.0 \times 10^{-6}$/K or lower, and the thermal expansion coefficient $\alpha_2$ is $16.0 \times 10^{-6}$/K or higher and $24.0 \times 10^{-6}$/K or lower.

* * * * *